United States Patent
Kisu et al.

(10) Patent No.: US 7,870,875 B2
(45) Date of Patent: Jan. 18, 2011

(54) CORRUGATED TUBE

(75) Inventors: Naomi Kisu, Shizuoka (JP); Masataka Nishijima, Shizuoka (JP)

(73) Assignee: Yakazai Corporation, Tokyo (JP)

( * ) Notice: Subject to any disclaimer, the term of this patent is extended or adjusted under 35 U.S.C. 154(b) by 0 days.

(21) Appl. No.: 12/078,431

(22) Filed: Mar. 31, 2008

(65) Prior Publication Data

US 2009/0000682 A1    Jan. 1, 2009

(30) Foreign Application Priority Data

Jun. 29, 2007    (JP) .............................. 2007-172690

(51) Int. Cl.
*F16L 11/00*    (2006.01)
(52) U.S. Cl. ....................... 138/121; 138/119
(58) Field of Classification Search .................. 138/121, 138/122, 119
See application file for complete search history.

(56) References Cited

U.S. PATENT DOCUMENTS

| | | | | |
|---|---|---|---|---|
| 2,143,960 A | * | 1/1939 | Stalter et. al. ................ | 138/110 |
| 2,157,564 A | * | 5/1939 | Peuthert ...................... | 138/121 |
| 3,578,777 A | * | 5/1971 | DeGain ....................... | 138/121 |
| 3,605,817 A | * | 9/1971 | Bauman ...................... | 138/121 |
| 3,715,454 A | * | 2/1973 | Kleykamp ................... | 174/47 |
| 3,855,799 A | * | 12/1974 | Martin et al. ................. | 405/49 |
| 4,064,355 A | * | 12/1977 | Neroni et al. ................. | 174/47 |
| 4,513,789 A | | 4/1985 | Bowen, Jr. et al. | |
| 4,524,808 A | * | 6/1985 | Fleischer et al. ............ | 138/103 |
| 5,520,222 A | * | 5/1996 | Chikama ..................... | 138/118 |
| 5,564,472 A | * | 10/1996 | Gipperich ................... | 138/121 |
| 5,706,864 A | * | 1/1998 | Pfleger ........................ | 138/121 |
| 5,829,916 A | * | 11/1998 | Evans .......................... | 405/43 |
| 6,021,816 A | * | 2/2000 | Jeltsch et al. ................ | 138/121 |
| 6,051,789 A | * | 4/2000 | Kato ........................... | 174/68.3 |
| 6,394,143 B1 | * | 5/2002 | Diels et al. .................. | 138/121 |
| 6,427,727 B1 | * | 8/2002 | Thomas ...................... | 138/106 |
| 6,659,135 B2 | * | 12/2003 | Sorkin ......................... | 138/121 |
| 6,666,232 B2 | * | 12/2003 | Lepoutre ..................... | 138/119 |
| 6,666,233 B1 | * | 12/2003 | Sorkin ......................... | 138/121 |
| 6,889,714 B1 | * | 5/2005 | Sorkin ......................... | 138/121 |
| 7,253,361 B2 | * | 8/2007 | Nishijima et al. ......... | 174/72 A |
| 2002/0005014 A1 | | 1/2002 | Doshita et al. | |

FOREIGN PATENT DOCUMENTS

DE    32 46 594 A1    6/1984

(Continued)

*Primary Examiner*—James F Hook
(74) *Attorney, Agent, or Firm*—Edwards Angell Palmer & Dodge LLP

(57) ABSTRACT

A corrugated tube which can easily bend a wiring harness in one direction and can make the wiring harness hardly bend in another direction crossing the one direction at right angles. The wiring harness is made so that it can hardly bend in the other direction, so that the slack of the wiring harness for use in supplying electric power to a slide door can be effectively prevented from occurring. The corrugated tube includes: dented grooves and projecting strips formed on an outer periphery of the corrugated tube and arranged alternately in a longitudinal direction of the corrugated tube; and a reinforcing rib formed projecting from an outer peripheral surface of the dented groove and extending beyond an outer peripheral surface of the projecting strip, the reinforcing rib being formed in the longitudinal direction of the corrugated tube.

2 Claims, 6 Drawing Sheets

| | FOREIGN PATENT DOCUMENTS | | JP | 2001-354085 | 12/2001 |
|---|---|---|---|---|---|
| | | | JP | 2006-050841 | 2/2006 |
| DE | 196 07 559 A1 | 9/1997 | JP | 2006-320145 | 11/2006 |
| DE | 299 21 103 U1 | 2/2000 | JP | 2007-60754 | 3/2007 |
| DE | 10 2004 005 310 A1 | 9/2005 | | | |

* cited by examiner

FIG. 1A
FIG. 1B
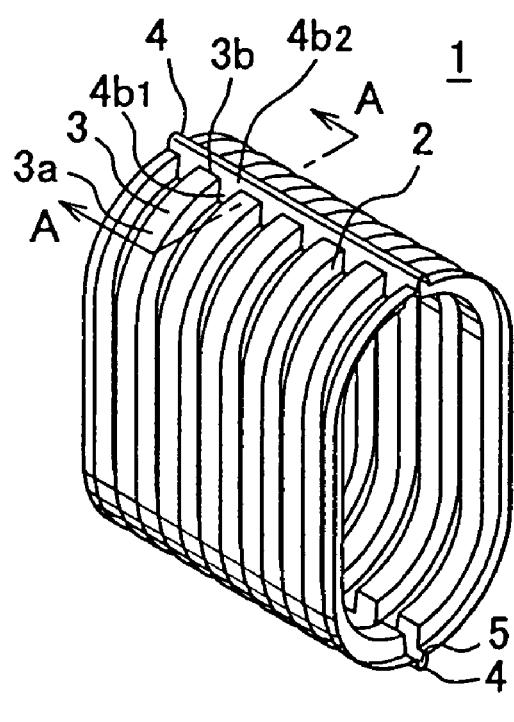
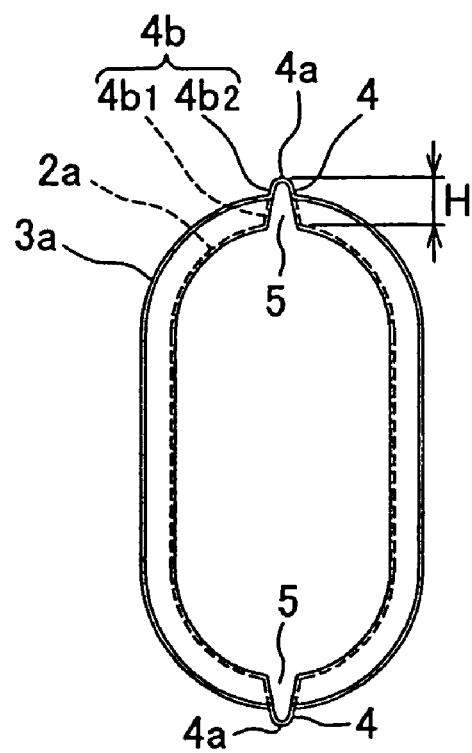

CORRUGATED TUBE

BACKGROUND OF THE INVENTION (1) Field of the Invention

The present invention relates to a bellows-shaped corrugated tube as a harness-protecting tube, through which an electric wire passes being bent, for supplying electric power to a slide door, slide seat or the like of a motor vehicle.

(2) Description of the Related Art

FIGS. 6 and 7 shows an example of a harness wiring structure using a conventional corrugated tube (for example, see Japanese Patent Application Laid-Open No. 2001-354085).

The harness wiring structure is for mounting a wiring harness 43 from a slide door 41 of a motor vehicle to a vehicle body 47 so as to supply electric power to electric equipment and auxiliary equipment located on the side of slide door. An outer periphery of the wiring harness 43 is equipped with a corrugated tube 43b made of synthetic resin so as to safely protect a plurality of electric wires 43a from interference with the outside. The corrugated tube 43b includes dented grooves and projecting strips on an outer periphery thereof, which are arranged alternately in a bellows-shape, and has an excellent flexibility. The wiring harness 43 is composed of a plurality of the electric wires 43a and the corrugated tube 43b.

On the side of the slide door 41, the wiring harness 43 is received in a protector 50 made of synthetic resin with being bent, biased in the upward direction by a leaf spring 44 made of metal, so that a slack of the wiring harness 43 upon half-opening of the slide door 41 is absorbed so as to prevent the wiring harness 43 from hanging down in an intermediate space 46 (see FIG. 7). The leaf spring 44 is fixed on the side of a lower front end of the protector 50 together with the wiring harness 43, wherein a harness fixing part is shown with a reference numeral 59.

The protector 50 is composed of a protector base 51 and a protector cover 52 and fixed to the slide door 41 being placed longitudinally, so that the wiring harness 43 is mounted shakably back and forth in the vehicle from a long lower opening 55 of the protector 50 to a harness-fixing tool 60 situated in the proximity of a step part 48 of the vehicle body 47 through the intermediate space 46.

FIG. 6 shows a fully closed state of the slide door 41, while FIG. 7 shows a half-opened state of the slide door 41, which is close to a fully opened state thereof. On the fully closed state of the slide door 41, the wiring harness 43 is pulled backward, while on the fully opened state of the slide door 41, the wiring harness 43 is pulled forward.

FIGS. 8A and 8B show an example of a conventional corrugated tube 61 (see Japanese Patent Application Laid-Open No. 2007-60754).

The corrugated tube 61 is made of synthetic resin and includes dented grooves (i.e. valley parts) 62 and projecting strips (i.e. mountain parts) 63 on an outer periphery thereof, which are arranged alternately in the longitudinal direction of the corrugated tube 61, and is formed in a bellows-shape. Ribs 64 having a height from an outer peripheral surface 62a of the valley part 62 to an outer peripheral surface 63a of the mountain part 63 are formed integrally with respective end parts situated on the side of long diameter, in a section of the corrugated tube 61 (see FIG. 8B), in the longitudinal direction of the corrugated tube 61, so that stiffness of the corrugated tube 61 in the long diameter direction in the section of the corrugated tube 61 is increased and therefore, the corrugated tube 61 is hardly bent in the long diameter direction thereof.

For example, when the corrugated tube 61 shown in FIG. 8 having a longitudinally long shape in section is used in the harness wiring structure (i.e. electric power supply structure) shown in FIG. 6, the hang of the wiring harness 43 between the slide door 41 and the vehicle body 47 (i.e. in the intermediate space 46) is further restricted.

The corrugated tube 61 shown in FIG. 8 can be applied to a structure, in which a wiring harness on a condition of longitudinally long shape in section for supplying electric power to a slide seat in a motor vehicle is bent in a U-shape so as to be mounted in a laterally long case. Moreover, for use in a slide door, besides the harness wiring structure shown in FIG. 6, the corrugated tube 61 shown in FIG. 8 can be applied to a structure, in which a wiring harness on a condition of laterally long shape in section is bent in a U-shape so as to be mounted in a rectangular case (i.e. protector), a slider is provided slidably in the case, and the wiring harness on a condition of longitudinally long shape in section is mounted from the slider to the side of the vehicle body through the intermediate space. These examples are described in Japanese Patent Application Laid-Open No. 2007-60754.

The corrugated tube 61 shown in FIG. 8 is effective, for example, in a case in which a slide stroke of the slide door is large or in a case in which a biasing means such as a leaf spring is not used to absorb the slack of the wiring harness. However, the corrugated tube 61 shown in FIG. 8 cannot make the slack of the wiring harness completely zero. Therefore, a corrugated tube that can further effectively prevent the slack of the wiring harness from occurring has been required.

Such a requirement can take place in a case in which the corrugated tube is applied to a slide structure such as a slide door of a vehicle except a motor vehicle or a slide door, for example, of a manufacturing apparatus or of an inspecting apparatus other than of a vehicle.

SUMMARY OF THE INVENTION

It is therefore an objective of the present invention to solve the above problem and to provide a corrugated tube which can easily bend a wiring harness in one direction and can make the wiring harness difficult to bend in another direction crossing the one direction at right angles, wherein the wiring harness is made difficult to bend in the other direction, so that the slack of the wiring harness, for example, for use in supplying electric power to a slide door can be further effectively prevented from occurring.

In order to attain the above objective, the present invention is to provide a corrugated tube including:

dented grooves and projecting strips formed on an outer periphery of the corrugated tube and arranged alternately in a longitudinal direction of the corrugated tube; and a reinforcing rib formed projecting from an outer peripheral surface of the dented groove and extending beyond an outer peripheral surface of the projecting strip, the reinforcing rib being formed in the longitudinal direction of the corrugated tube.

With the construction described above, because the total height of the rib is longer than that of a rib formed from the outer peripheral surface of the dented groove to the outer peripheral surface of the projecting strip, therefore stiffness of the corrugated tube upon being bent in the height direction of the rib or in a direction reverse to the height direction is improved. Accordingly, when a wiring harness equipped with such a corrugated tube is mounted on a slide door or the like, a slack of the wiring harness is securely prevented from occurring and therefore, an interferential noise or abrasion is securely prevented from occurring.

An inside of the rib is partly or entirely formed hollow.

With the construction described above, flexibility of the corrugated tube in the width direction of the rib (i.e. a direction crossing the projecting direction of the rib at right angles) is secured. Therefore, flexibility of the wiring harness upon opening and closing of the slide door is excellently secured and operation characteristic of the slide door is excellently secured. Further, when the inside of the rib is partly hollow (i.e. partly solid), bending stiffness of the corrugated tube in the height direction of the rib and in a direction reverse to the height direction of the rib is improved.

An inside of the rib is formed solid.

With the construction described above, the bending stiffness of the corrugated tube in the height direction of the solid rib and in a direction reverse to the height direction of the solid rib is further improved.

In order to attain the above objective, the present invention is also to provide a corrugated tube including:

dented grooves and projecting strips formed on an outer periphery of the corrugated tube and arranged alternately in a longitudinal direction of the corrugated tube; and a reinforcing rib formed in the longitudinal direction of the corrugated tube, wherein an inside of the rib is partly or entirely formed solid.

With the construction described above, in comparison with a case in which the rib is entirely hollow, the bending stiffness of the corrugated tube in the height direction of the rib and in a direction reverse to the height direction of the rib is improved. Accordingly, when a wiring harness equipped with such a corrugated tube is mounted on a slide door or the like, a slack of the wiring harness is securely prevented from occurring and therefore, an interferential noise or abrasion is securely prevented from occurring.

When the rib is partly solid, the flexibility of the corrugated tube in a direction crossing the height direction of the rib at right angles is excellently secured.

The rib may be formed from the outer peripheral surface of the dented groove to the outer peripheral surface of the projecting strip or, alternatively, may be formed from the outer peripheral surface of the dented groove to a height at which the rib does not reach the outer peripheral surface of the projecting strip. Further, the rib may be formed from the outer peripheral surface of the dented groove to a height at which the rib exceeds the outer peripheral surface of the projecting strip.

The rib is formed from an outer peripheral surface of the dented groove to an outer peripheral surface of the projecting strip.

With the construction described above, since a top surface of the rib is flush with the outer peripheral surface of the projecting strip, therefore the rib does not project to the outside. That is, the rib is free from interference with the outside and therefore free from deformation or damage caused by such interference.

The corrugated tube has an elliptic shape in section and the rib is formed at an end part situated on a long diameter-side of the elliptic shape.

With the construction described above, since the flexibility of the rib in a direction of a short diameter of the elliptic shape is excellent, therefore the corrugated tube can be easily bent in the direction of the short diameter of the elliptic shape with small force while the corrugated tube is hardly bent in the direction of the long diameter of the elliptic shape. Accordingly, the bending of the wiring harness upon opening and closing of the slide door can be excellently performed in the direction of the short diameter of the elliptic shape of the corrugated tube. Therefore, operation characteristic of the slide door is improved and the harness wiring structure can be compact in the direction of the short diameter of the elliptic shape of the corrugated tube.

A pair of the ribs is arranged in a direction of 180 degrees.

With the construction described above, since the pair of the ribs is symmetrically arranged in the height direction of the rib, therefore the bending stiffness of the corrugated tube in the height direction of the rib and in a direction reverse to the height direction of the rib is further improved.

BRIEF DESCRIPTION OF THE DRAWINGS

FIG. 1A is a perspective view illustrating the first preferred embodiment of a corrugated tube according to the present invention;

FIG. 1B is a cross sectional view of the corrugated tube taken along A-A line in FIG. 1A;

DESCRIPTION OF THE PREFERRED EMBODIMENTS

Figure 2A:
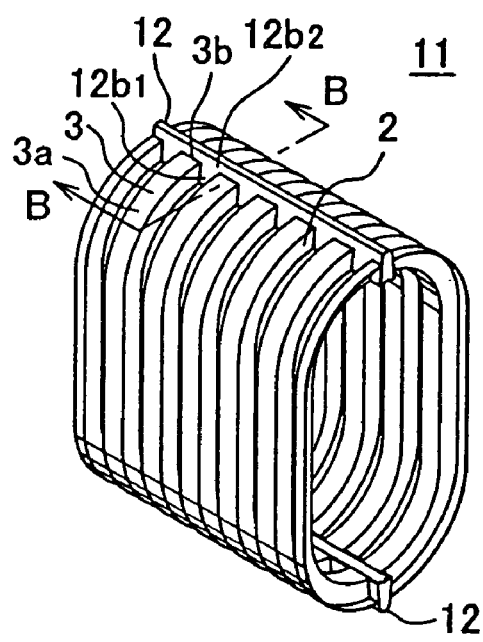
FIG. 2A is a perspective view illustrating the second preferred embodiment of a corrugated tube according to the present invention.

FIGS. 1A and 1B show the first preferred embodiment of a corrugated tube according to the present invention.

The corrugated tube 1 is made of synthetic resin and includes dented grooves (i.e. valley parts) 2 and projecting strips (i.e. mountain parts) 3 on an outer periphery thereof, which are arranged alternately in a longitudinal direction of the corrugated tube 1, and has an elliptical shape in section, wherein at both end parts situated on a long diameter-side of the elliptical shape, a rib 4 is integrally formed projecting from an outer peripheral surface (i.e. bottom surface) 2a of the valley part 2 and extending beyond an outer peripheral surface (i.e. top surface) of the mountain part 3, and the inside of the rib 4 is made hollow (a corresponding hollow part being denoted by a reference numeral 5).

Figure 8A:
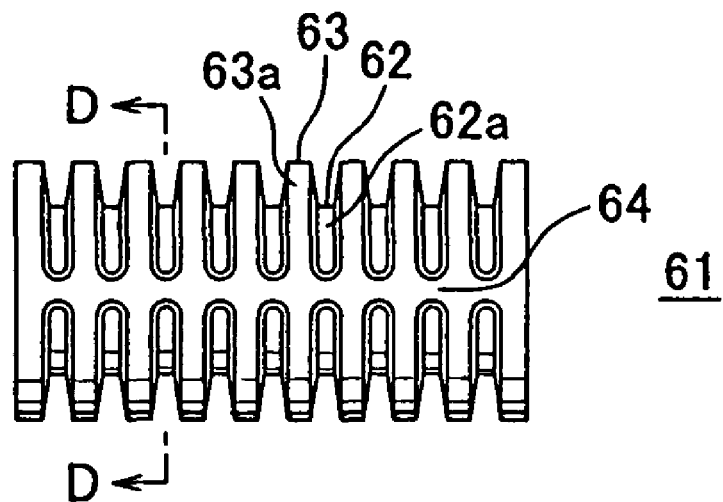
FIG. 8A is a plan view illustrating an example of a conventional corrugated tube.

In comparison with the conventional example shown in FIG. 8, in the conventional example the top of the rib is flush with the top surface of the mountain part, on the other hand as for the corrugated tube 1 shown in FIGS. 1A and 1B, a top part 4a of the rib 4 projects outward beyond a top surface 3a of the mountain part 3. That is, the height H of the rib 4 is larger than that of the conventional rib.

Referring to the upper rib 4 shown in FIG. 1A, an end part 3b of the projecting strip 3 crosses at right angles a side surface 4b1 of a lower half part of the rib 4, and a side surface 4b2 of an upper half part of the rib 4 projects outward beyond a top surface of the end part 3b of the projecting strip 3 so as to form a flat surface extending along the longitudinal direction of the corrugated tube 1.

Thus, since the rib 4 is projectingly formed extending beyond the height of the conventional rib, therefore bending stiffness of the corrugated tube 1 in the long-diameter direction of the elliptic shape is improved. Bending stiffness of the corrugated tube 1 in the short-diameter direction of the elliptic shape stays as low as that of the conventional corrugated tube.

As shown in FIG. 1B, both side surfaces 4b of the rib 4 continues crossing the bottom surface 2a of the valley part 2 at right angles, gradually decreases its inner width in a tapered shape as approaching the top part 4a, and smoothly continues in an arc-shape at the top part 4a. Due to this shape of the rib 4, the bending stiffness of the corrugated tube 1 in the short-diameter direction is increased. The rib 4 may have a rectangular shape in section like a shape of the conventional example shown in FIG. 8. As shown in FIG. 1B, shapes of the ribs 4 situated up and down are symmetrical and have the same shape. The corrugated tube 1 is shown in FIG. 1A on a cut condition thereof.

A method of manufacturing the corrugated tube 1 shown in FIGS. 1A and 1B includes the steps of: in a known blow molding, providing each mold (not shown) of a division type with a dented part having dented grooves and projecting strips arranged alternately on an outer periphery thereof, forming a projecting groove which continues to the dented part, setting a balloon-shaped resin material within the dented part, heating and expanding the resin material so as to allow the resin material to adhere to respective inner surfaces of the dented part and the projecting groove, forming a corrugated tube body (i.e. a portion other than the ribs 4) in the dented part, and forming the hollow ribs 4 in the projecting groove. A thickness of the rib 4 is similar to those of the valley part 2 and the mountain part 3 of the corrugated tube body.

Figure 2B:
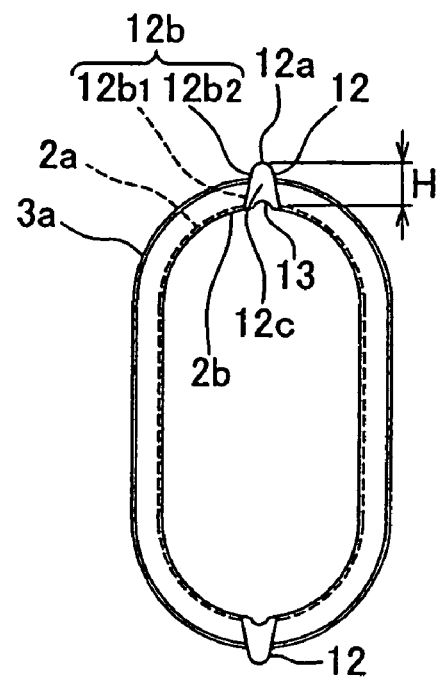
FIG. 2B is a cross sectional view of the corrugated tube taken along B-B line in FIG. 2A.

FIGS. 2A and 2B illustrate the second preferred embodiment of a corrugated tube 11 according to the present invention.

The corrugated tube 11 is made of synthetic resin and includes dented grooves (i.e. valley parts) 2 and projecting strips (i.e. mountain parts) 3 on an outer periphery thereof, which are arranged alternately in a longitudinal direction of the corrugated tube 11, and has an elliptical shape in section, wherein at both end parts situated on a long diameter-side of the elliptical shape, a rib 12 is integrally formed projecting from an outer peripheral surface (i.e. bottom surface) 2a of the valley part 2 and extending beyond an outer peripheral surface (i.e. top surface) 3a of the mountain part 3, and the inside of the rib 12 is made solid (a corresponding solid part being denoted by a reference numeral 12c).

As shown in FIG. 2A, an end part 3b of the projecting strip 3 crosses at right angles a side surface 12b1 of a lower half part of the rib 12, and a side surface 12b2 of an upper half part of the rib 12 projects outward beyond a top surface of the end part 3b of the projecting strip 3 so as to form a flat surface extending along the longitudinal direction of the corrugated tube 11.

As shown in FIG. 2B, both side surfaces 12b of the rib 12 continues crossing the bottom surface 2a of the valley part 2 at right angles, gradually increases its inner width in a tapered shape as approaching the top part 12a, and smoothly continues in an arc-shape at the top part 12a. There is shown a small recess 13 on a bottom part of the rib 12. However, the bottom surface (inner surface) of the rib 12 may smoothly continue to an inner peripheral surface 2b of the valley part 2 with the same arc surface without such a recess 13. The rib 12 may have a rectangular shape in section like a shape of the conventional example shown in FIG. 8. As shown in FIG. 2B, shapes of the ribs 12 situated up and down are symmetrical and have the same shape. The corrugated tube 11 is shown in FIG. 2A on a cut condition thereof.

In comparison with the conventional example shown in FIG. 8, in the conventional example the top of the rib is flush with the top surface of the mountain part, on the other hand as for the corrugated tube 11 shown in FIGS. 2A and 2B, a top part 12a of the rib 12 projects outward beyond a top surface 3a of the mountain part, and the inside of the rib 12 is solid. That is, the height H of the rib 12 is larger than that of the conventional rib.

Thus, since the rib 12 is projectingly formed extending beyond the height of the conventional rib and the inside of the rib 12 is solid, therefore bending stiffness of the corrugated tube 11 in the long-diameter direction of the elliptic shape is increased compared to that of the corrugated tube 1 shown in FIGS. 1A and 1B and to that of the conventional example of the corrugated tube.

A method of manufacturing the corrugated tube 11 shown in FIGS. 2A and 2B includes the steps of: in a known blow molding, providing each mold (not shown) of a division type with a dented part having dented grooves and projecting strips arranged alternately on an outer periphery thereof, forming a projecting groove which continues to the dented part, setting a balloon-shaped resin material within the dented part, making a thickness of the resin material on the long-diameter side thereof larger than that of the other part, heating and expanding the resin material so as to allow the resin material to adhere to respective inner surfaces of the dented part and the projecting groove, forming a corrugated tube body (i.e. a portion other than the ribs 12) in the dented part, and forming the solid ribs 12 in the projecting groove.

Figure 2C:
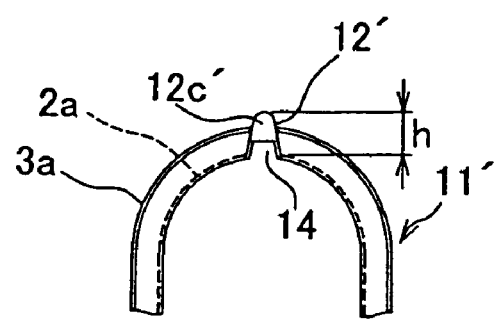
FIG. 2C is a cross sectional view of another preferred embodiment of a corrugated tube according to the present invention.

In the method of manufacturing the corrugated tube 11 shown in FIGS. 2A and 2B, by making the thickness of both end parts situated on the long-diameter side of the resin material having a balloon shape be various, as shown in FIG. 2C, it is possible to make the rib 12' partly hollow and partly solid (here, partly hollow part being denoted by a reference numeral 12c' and partly solid part being denoted by a reference numeral 14). As shown in FIG. 2C, as for a degree of partly hollow, a part between the outer peripheral surface 2a of the valley part 2 and the outer peripheral surface 3a of the mountain part 3 may be made hollow or, alternatively, a lower half of the rib part (denoted by a reference numeral h) projecting from the outer peripheral surface 3a of the mountain part 3 may be made hollow. A corrugated tube shown in FIG. 2C is denoted by a reference numeral 11'.

Figure 3A:
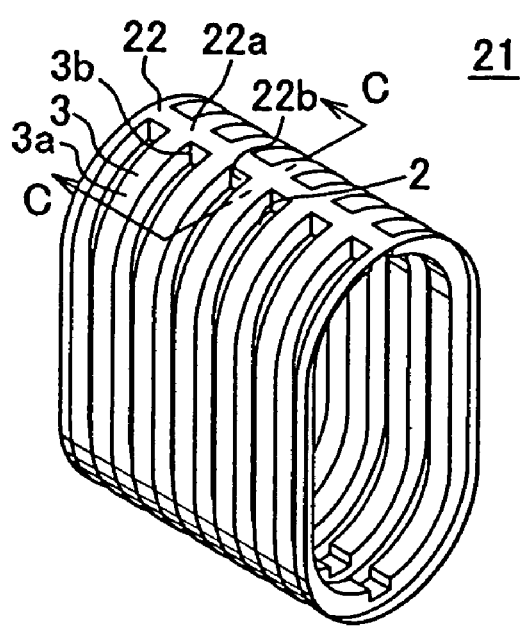
FIG. 3A is a perspective view illustrating the third preferred embodiment of a corrugated tube according to the present invention.
Figure 3B:
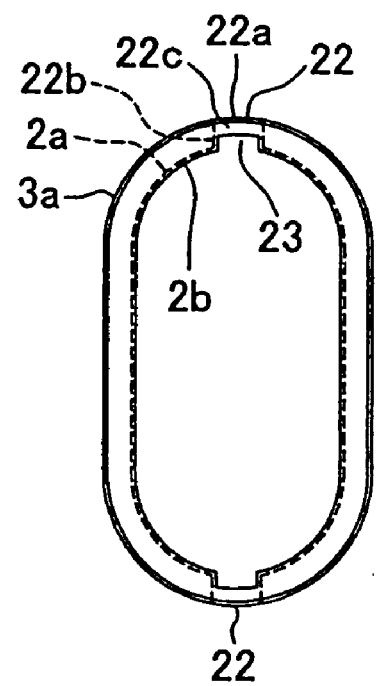
FIG. 3B is a cross sectional view of the corrugated tube taken along C-C line in FIG. 3A.

FIGS. 3A and 3B illustrate the third preferred embodiment of a corrugated tube 21 according to the present invention.

The corrugated tube 21 is made of synthetic resin and includes dented grooves (i.e. valley parts) 2 and projecting strips (i.e. mountain parts) 3 on an outer periphery thereof, which are arranged alternately in a longitudinal direction of the corrugated tube 21, and has an elliptical shape in section, wherein at both end parts situated on a long diameter-side of the elliptical shape, a rib 22 is integrally formed from an outer peripheral surface (i.e. bottom surface) 2a of the valley part 2 and extending to an outer peripheral surface (i.e. top surface) 3a of the mountain part 3, and the inside of the rib 22 is made partly solid and partly hollow (a corresponding solid part being denoted by a reference numeral 22c and a corresponding hollow part being denoted by a reference numeral 23).

Figure 8B:
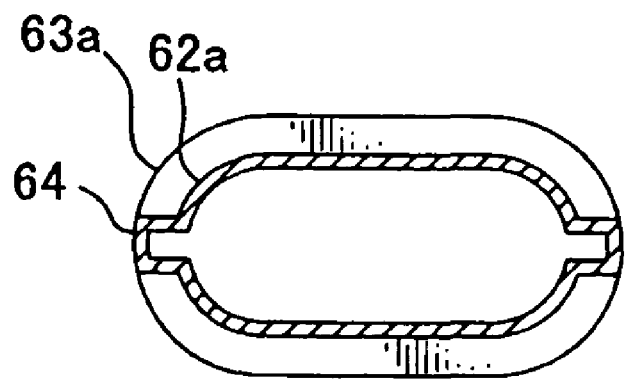
FIG. 8B is a cross sectional view of the conventional corrugated tube taken along D-D line in FIG. 8A.

The corrugated tube 21 shown in FIGS. 3A and 3B corresponds to a corrugated tube, in which the inside of the rib of the conventional example of a corrugated tube shown in FIG. 8B is made partly solid and partly hollow. Here, partly solid means that a part of the rib 22 situated on a top part 22a-side thereof in the height direction is made solid. A surface of the top part 22a is flush with the top surface 3a of the mountain part 3.

A method of manufacturing the corrugated tube 21 shown in FIGS. 3A and 3B includes the steps of: in a known blow molding, providing each mold (not shown) of a division type with a dented part having dented grooves and projecting strips arranged alternately on an outer periphery thereof, forming a small groove which is higher than an inner peripheral surface of the dented groove and lower than an outer peripheral surface of the projecting strip inside the dented part, setting a balloon-shaped resin material within the dented part, heating and expanding the resin material so as to allow the resin material to adhere to an inner surface of the dented part, forming a corrugated tube body (i.e. a portion other than the ribs 22) in the dented part, and forming the partly solid (and partly hollow) ribs 22 in the small groove.

Figure 3C:
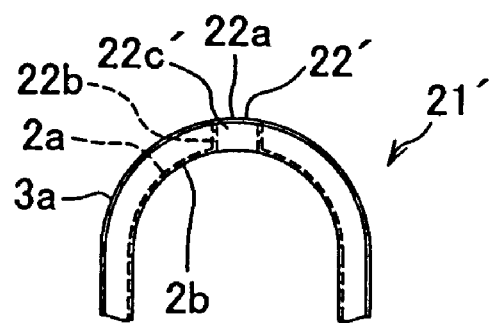
FIG. 3C is a cross sectional view of a further preferred embodiment of a corrugated tube according to the present invention.

A thickness of the solid part of the rib 22 can be a desirable thickness by suitably setting a depth of a small groove of a mold. As shown in FIG. 3C, the entire rib 22 may be made solid. The rib, the solid part of the rib and the corrugated tube shown in FIG. 3C are denoted by reference numerals 22', 22c' and 21', respectively. To make the entire rib 22 solid is to make the rib 22 solid in the height direction thereof from an inner peripheral surface 2b of the valley part 2 to a top part 22a of the rib 22.

In comparison with the conventional example shown in FIG. 8, the third preferred embodiment of a corrugated tube 21 shown in FIGS. 3A and 3B is similar to the conventional example in a point that the top part 22a of the rib 22 has the same height as that of the top surface 3a of the mountain part 3, while differs from the conventional example in a point that the inside of the rib is partly solid or entirely solid.

Referring to the upper rib 22 shown in FIG. 3A, an end part 3b of the projecting strip 3 crosses at right angles a side surface 22b of the rib 22 throughout the whole height of the side surface 22b. As shown in FIG. 3B, a section of the rib 22 is formed in a rectangular shape. The section of the rib 22 may be formed in a tapered shape as shown in FIG. 1B.

Thus, the bending stiffness of the corrugated tube 21 in the long-diameter direction of the elliptical shape of the section thereof is improved by making the rib 22 partly solid or entirely solid.

In the preferred embodiment shown in FIGS. 3A and 3B, the rib 22 may be formed low extending from the outer peripheral surface 2a of the dented groove 2 and not reaching the outer peripheral surface 3a of the projecting strip 3 and formed partly solid or entirely solid. In such a case, the top part 22a of the rib 22 is situated lower than the outer peripheral surface 3a of the projecting strip 3.

Figure 4:
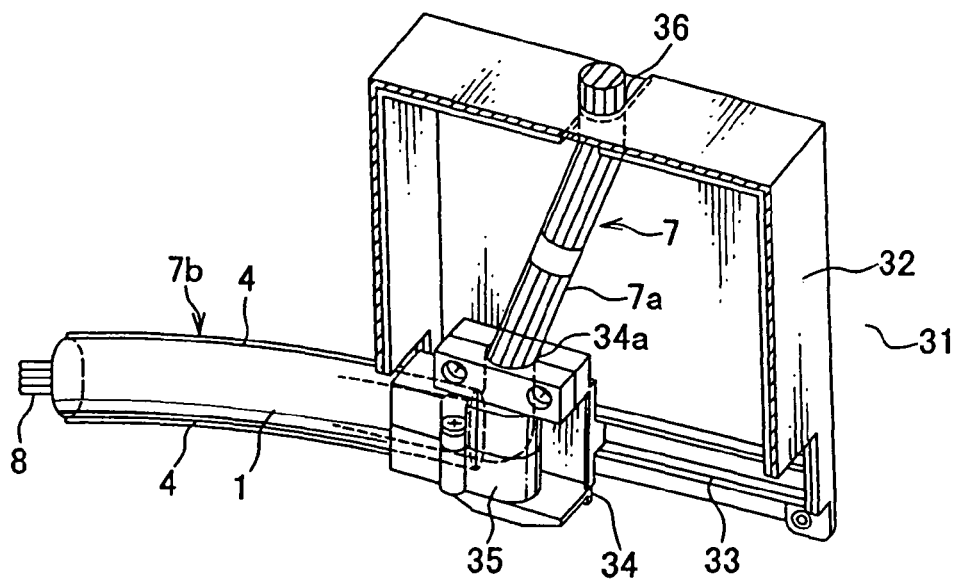
FIG. 4 is a perspective view illustrating an example of application of the corrugated tube according to the present invention.
Figure 5:
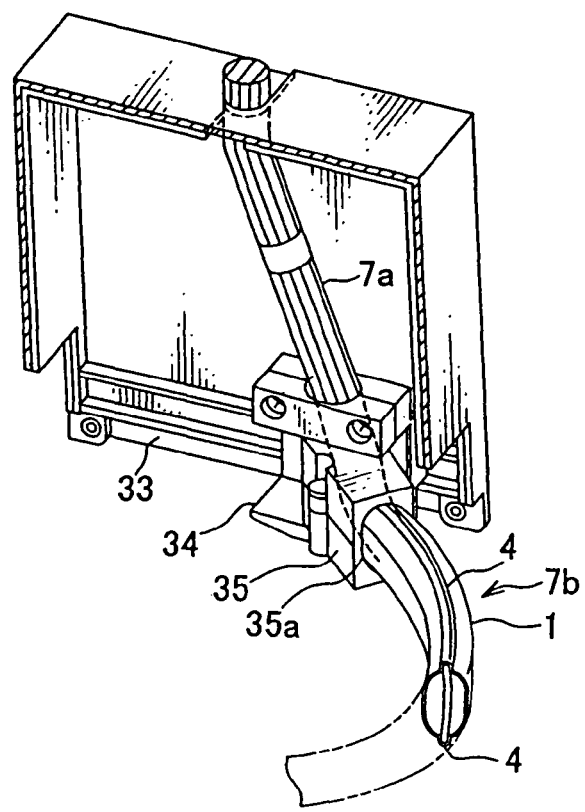
FIG. 5 is a perspective view illustrating action of the example of application of the corrugated tube according to the present invention.
Figure 6:
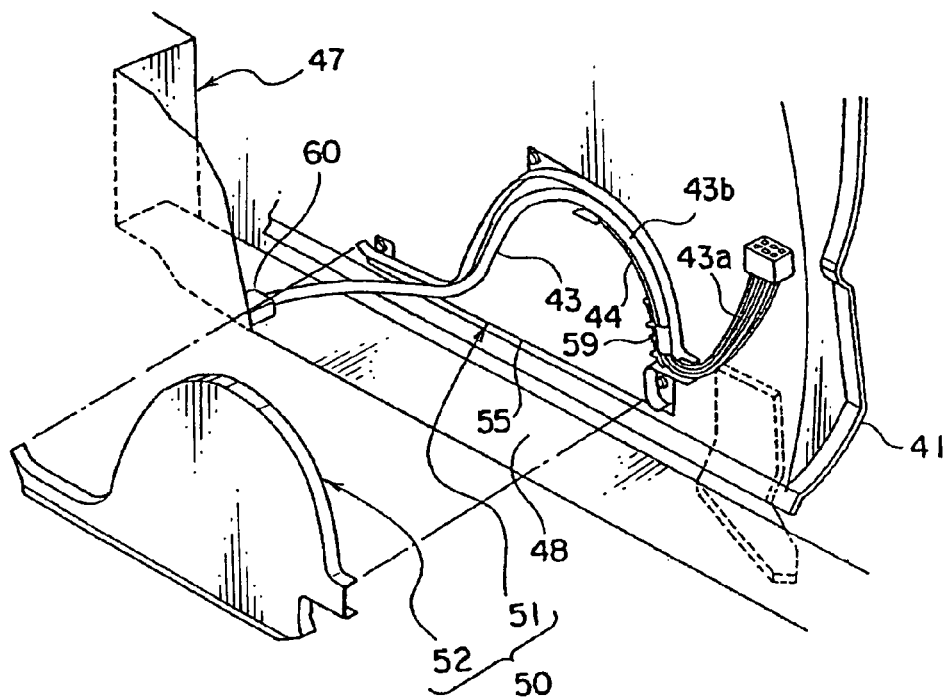
FIG. 6 is an exploded perspective view illustrating an example of a harness wiring structure using a conventional corrugated tube.
Figure 7:
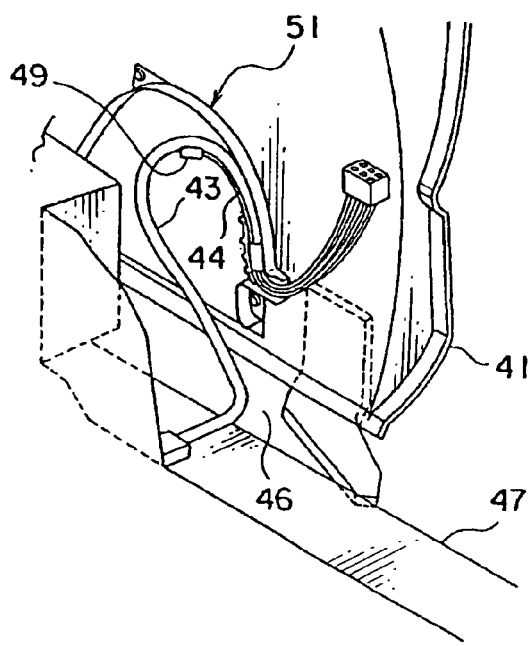
FIG. 7 is perspective view illustrating action of the example of the harness wiring structure using the conventional corrugated tube.

FIG. 4 is a perspective view illustrating an example of application of the corrugated tube 1, 11 and 21 as described above. FIG. 5 is a perspective view illustrating action of the example of application of the corrugated tube 1, 11 and 21.

In a harness wiring structure utilizing, for example, the corrugated tube 1, a case 32 is longitudinally fixed to a door inner panel 31 of a slide door of a motor vehicle, a horizontal guide rail 33 is provided on a lower part of the case 32, a slider 34 is allowed to slidably engage with the guide rail 33, the slider 34 is provided with a swing member 35 swingably (rotatably) in the horizontal direction, an upper end part of a hanging part 7a of a wiring harness 7 is fixed on an upper wall of the case 32 (a harness fixing part being denoted by a reference numeral 36), the hanging part 7a is bent from an upper hole 34a of the slider 34 along a L-shaped hole 35a of the swing member 35, and the hanging part 7a as a horizontal wiring harness part 7b is guided out to a harness fixing part (not shown in the figure) situated on the vehicle body-side together with the corrugated tube 1.

One end of the corrugated tube 1 is fixed to a projecting strip (not shown) on an inner peripheral surface of the horizontal hole 35a of the swing member 35 being engaged with a dented groove (not shown) in the peripheral direction. Similarly, an opposite end of the corrugated tube 1 is fixed to a harness fixing part situated at the vehicle body-side. A plurality of electric wires 8 are allowed to pass through the corrugated tube 1 and connected to a wiring harness (not shown) situated at the vehicle body-side with a portion thereof, which passes through the wiring harness situated at the vehicle body-side. The corrugated tube 1 is arranged longitudinally in section, wherein ribs 4 for improving the stiffness of the corrugated tube 1 are arranged up and down throughout the entire length of the corrugated tube 1.

FIG. 4 shows a fully closed state of the slide door 31, wherein the slide door 31 is moved forward, the slider 34 is situated on a rear end side of the guide rail 33, the swing member 35 faces backward, and the corrugated tube part 7b(1) extends approximately straight toward a rear harness fixing part situated at the vehicle body-side. On this condition, the stiffness of the corrugated tube 1 in an up-and-down direction is increased by means of a pair of the high ribs 4 situated up and down (high and solid ribs 12 in the second preferred embodiment; partly or entirely solid ribs 22 in the third preferred embodiment). Therefore, the hanging-down (i.e. slack) is securely prevented from occurring and an interferential noise or abrasion with the vehicle body is securely prevented from occurring.

FIG. 5 shows a nearly fully opened state of the slide door 31, wherein the slide door 31 is moved backward, the slider 34 is situated on a front end side of the guide rail 33, the swing member 35 faces forward diagonally, and the corrugated tube part 7b(1) is bent in a U-shape toward a harness fixing part (not shown) situated at the vehicle body-side. On this condition, the stiffness of the corrugated tube 1 in an up-and-down direction is increased by means of a pair of the high ribs 4 situated up and down (high and solid ribs 12 in the second preferred embodiment; partly or entirely solid ribs 22 in the third preferred embodiment). Therefore, the hanging-down (i.e. slack) is securely prevented from occurring. Since the hanging-down of the corrugated tube part 7b is prevented from occurring when the slide door 31 is half opened, therefore the corrugated tube 1 is securely prevented from being caught in between the slide door 31 and the vehicle body when the slide door 31 is being closed.

In the preferred embodiments shown in FIGS. 4 and 5, a slide door panel 31 may directly be provided with a harness fixing part (36) such as a clamp and a guide rail 33 without the case 32. Shapes of the slider 34 and the swing member 35 may be changed suitably according to a need. The slider 34 as a support member may be fixed on a door inner panel 31 without the guide rail 33 so as to allow only the swing action of the horizontal corrugated tube part 7b to be performed. In both cases, the similar effect can be obtained when the slide door 31 is opened or closed.

In the preferred embodiments described above, the corrugated tube having an elliptical shape in section is used. However, instead, a corrugated tube having a round shape in section may be used, wherein the ribs, 1, 11, 11' or 21 are formed up and down of the corrugated tube having a round shape in section. Further, the arrangement of the ribs, 1, 11, 11' or 21 may be right and left (i.e. in the horizontal direction) of the corrugated tube instead of up and down (i.e. in the vertical direction) of the corrugated tube. One of the pair of the ribs may be a type different from that of another of the pair of the ribs (for example, a mixture of the rib shown in FIG. 1 and the rib shown in FIG. 2 or, alternatively, a mixture of the rib shown in FIG. 1 and the rib shown in FIG. 3). Furthermore, only one rib 1, 11, 11' or 21 may be used instead of a pair of the ribs, 1, 11, 11' or 21.

The aforementioned preferred embodiments are described to aid in understanding the present invention and variations may be made by one skilled in the art without departing from the spirit and scope of the present invention.

What is claimed is:

1. A corrugated tube comprising:
    dented grooves and projecting strips formed on an outer periphery of the corrugated tube and arranged alternately in an entire longitudinal direction of the corrugated tube; and
    a pair of reinforcing ribs integrally formed with said grooves and projecting strips, said reinforcing ribs projecting from an outer peripheral surface of the dented grooves and extending beyond an outer peripheral surface of the projecting strips, the reinforcing ribs being formed 180° apart and extending uninterrupted in the entire longitudinal direction of the corrugated tube,
    wherein each of the reinforcing ribs have straight sidewall portions, and gradually decreases in width thereof in a tapered shape as approaching a top part thereof, the straight sidewall portions extending beyond the outer peripheral surface of the projectinq strips which extend uninterrupted in the entire longitudinal direction of the corrugated tube, and an inside of each of the ribs is partly or entirely formed hollow.

2. The corrugated tube according to claim 1, wherein the corrugated tube has an elliptical shape in section and the rib is formed at an end part situated on a long diameter-side of the elliptical shape.

* * * * *